US008750295B2

(12) United States Patent
Liron

(10) Patent No.: US 8,750,295 B2
(45) Date of Patent: Jun. 10, 2014

(54) EMBEDDED AUDIO ROUTING SWITCHER

(75) Inventor: John Edward Liron, Rough and Ready, CA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 354 days.

(21) Appl. No.: 12/448,498

(22) PCT Filed: Dec. 20, 2006

(86) PCT No.: PCT/US2006/048697
§ 371 (c)(1),
(2), (4) Date: Jun. 22, 2009

(87) PCT Pub. No.: WO2008/079112
PCT Pub. Date: Jul. 3, 2008

(65) Prior Publication Data
US 2010/0026905 A1    Feb. 4, 2010

(51) Int. Cl.
*H04Q 11/00*    (2006.01)
(52) U.S. Cl.
USPC ............................ 370/388; 370/254; 370/389
(58) Field of Classification Search
None
See application file for complete search history.

(56) References Cited

U.S. PATENT DOCUMENTS

| | | | |
|---|---|---|---|
| 5,144,548 A * | 9/1992 | Salandro | 700/9 |
| 5,483,538 A | 1/1996 | Rainbolt | |
| 5,625,461 A * | 4/1997 | Okamoto et al. | 386/239 |
| 6,069,607 A | 5/2000 | Everett et al. | |
| 6,085,163 A | 7/2000 | Todd | |
| 6,104,997 A * | 8/2000 | Shuholm | 704/500 |
| 6,690,428 B1 | 2/2004 | Hudelson et al. | |
| 6,842,485 B2 * | 1/2005 | Monda et al. | 375/240.25 |
| 6,859,579 B2 * | 2/2005 | Shiozawa et al. | 385/18 |
| 7,013,361 B2 * | 3/2006 | Liron | 710/316 |
| 7,283,965 B1 * | 10/2007 | Michener | 704/500 |
| 7,774,494 B2 * | 8/2010 | Hauke | 709/237 |
| 2002/0167608 A1 | 11/2002 | Szybiak et al. | |
| 2003/0142233 A1 | 7/2003 | Eckhardt et al. | |
| 2004/0073916 A1 | 4/2004 | Petrovic et al. | |

(Continued)

FOREIGN PATENT DOCUMENTS

| | | |
|---|---|---|
| CA | 2323564 | 5/2008 |
| EP | 1041756 | 10/2000 |

(Continued)

OTHER PUBLICATIONS

Meert et al., "Use of packet switching for the transport of real-time video," Journal of the Institution of British Telecommunications Engineers, vol. 1, pt.3, pp. 94-97, Jul.-Sep. 2000.

(Continued)

*Primary Examiner* — Robert Wilson
(74) *Attorney, Agent, or Firm* — Arent Fox LLP

(57) ABSTRACT

An embedded-audio routing switcher includes an input configured to receive digital input signals. The digital input signals include video with embedded audio. The input being coupled to a deembedding module configured to deembed audio from each of the digital input signals. A crosspoint matrix is configured to receive the digital input signals and transfer the digital input signals to an output. A time division multiplexed path is configured to transport the deembedded audio signals to the output. The output is configured to route one of the digital input signals and selected deembedded audio signals in accordance with a routing control setting.

4 Claims, 7 Drawing Sheets

(56) References Cited

U.S. PATENT DOCUMENTS

| | | |
|---|---|---|
| 2005/0083216 A1 | 4/2005 | Li |
| 2006/0206618 A1 | 9/2006 | Zimmer et al. |
| 2006/0271980 A1* | 11/2006 | Mankovitz ................. 725/90 |
| 2007/0199043 A1* | 8/2007 | Morris ..................... 725/143 |
| 2009/0121740 A1* | 5/2009 | Hauke ....................... 326/30 |
| 2010/0026905 A1* | 2/2010 | Liron ....................... 348/705 |

FOREIGN PATENT DOCUMENTS

| | | |
|---|---|---|
| GB | 2291574 | 1/1996 |
| GB | 2330475 | 4/1999 |
| GB | RD491111 | 3/2005 |
| JP | 10-200207 A | 10/1998 |
| JP | 11-112482 A | 4/1999 |
| JP | 11-328852 A | 11/1999 |
| JP | 2001060383 | 3/2001 |
| JP | 2003-199045 A | 7/2003 |
| JP | 2004-266866 A | 9/2009 |
| KR | 2004083601 | 10/2004 |
| KR | 20050037663 | 4/2005 |
| WO | 2004064277 A2 | 7/2004 |
| WO | 2006042207 A1 | 4/2006 |
| WO | WO2006042207 | 4/2006 |

OTHER PUBLICATIONS

Warth, "Implementation of a large digital routing system at the CBC broadcast center," SMPTE Journal, vol. 103, No. 2, pp. 105-109, Feb. 1994.
International Search Report, dated Sep. 18, 2007.
European Search Report mailed Mar. 8, 2012 in European Application No. 06847871.8.
EP Examination Report for EP 06 847 871.8 dated Oct. 22, 2012.
Summons to attend oral proceedings, including annex, for EP 06 847 871.8 dated Mar. 15, 2013.
Notification of Reasons for Rejection from the Japanese Patent Office in Japanese Patent Application No. 2009-542739, dated Apr. 12, 2011.
Notification Concerning Transmittal of International Preliminary Report on Patentability regarding PCT Application No. PCT/US2006/048697, dated Jun. 23, 2009, with Sep. 18, 2007 Written Opinion.
Office Action from Canadian Patent Office regarding Canadian Application No. 2,672,418, dated Dec. 4, 2013.
Office Action from Chinese Patent Office regarding Chinese Patent Application No. 200680056681.7, dated Aug. 9, 2010.
Oral Proceedings scheduled for Nov. 21, 2013 regarding EP Patent Application No. 06847871.8.

* cited by examiner

EMBEDDED AUDIO ROUTING SWITCHER

CROSS-REFERENCE TO RELATED APPLICATIONS

This application claims the benefit, under 35 U.S.C. §365 of International Application PCT/US2006/48697 and filed Dec. 20, 2006, which was published in accordance with PCT Article 21(2) on Jul. 3, 2008, in English.

TECHNICAL FIELD

The present invention generally relates to switching systems and more particularly to systems and methods including a serial digital video router switching matrix with full embedded audio switching capability, which is independent from the video switching.

BACKGROUND

Routing switchers may also be called signal selectors, audio/video (AV) selectors or simply routers. A standard routing switcher may have multiple video and audio signals from a number of sources, such as Videotape Recorders, Media Servers, Satellite Receivers, etc. connected to the routers inputs. The router's output or outputs can go to one or more destinations, such as Videotape Recorders, Video/Audio Mixers, Video/Audio Monitors, etc. Which input connects to which output(s) may be selected by a user with the push of a button, without disconnecting/reconnecting audio and video cables.

In a television facility, a single program may require switching to a plurality of different channels or stations. In some situations, the audio that is embedded may not be appropriate for each channel. For example, a different language may be needed or a dubbed version of the audio track may be required. In these situations, the audio output must be switched independently from the video. A routing switcher may be employed to perform this task.

When constructing a signal switching infrastructure for a television facility, a choice needs to be made to use video with embedded audio as a single switching level or to use independent audio routing matrices to switch audio separately from video. The advantages of switching video with embedded audio include a substantial reduction of switching hardware and system cabling when compared with separate audio switching matrices. Many modern devices such as video tape recorders, media servers and master control switchers support video inputs and outputs with embedded audio.

A principal disadvantage is that conventional serial digital video switching matrices do not permit independent switching of the embedded audio streams within the video signal. This makes it difficult to combine, e.g., the video from input #1 with the audio from input #2 at an output of the switching matrix. In many facilities, especially production/post production, or where multi-channel and/or multilingual audio must be considered, this limitation has dictated the use of a separate audio switching infrastructure.

In the past, separate audio switching infrastructures have been employed (with the attendant increase in cost, space needed, cabling and power consumption). Hybrid systems using outboard audio embedding and de-embedding devices in conjunction with serial digital video switching matrices have also been employed. This alterative is also costly and complex to implement.

SUMMARY

In an aspect of the invention, an apparatus includes a separator for selectively separating audio from input signals including video with audio, a switcher for selectively transferring the input signals to at least one output, a multiplexed path for sending the separated audio signal to the at least one output, the at least one output being configured for selectively directing the input signals and separated audio signals.

In another aspect of the invention, an apparatus includes at least one input board configured to receive digital input signals, the digital input signals including video with embedded audio, the at least one input board including: a de-embed module configured to de-embed audio from each of the digital input signals, a time division multiplexer configured to multiplex all of the de-embedded audio to at least one output board, a crosspoint matrix configured to receive the digital input signals and transfer the digital input signals to the at least one output board, a time division multiplexed path configured to transport the de-embedded audio signals to the at least one output board separately from the digital input signals, and the at least one output board configured to route one of the digital input signals and selected de-embedded audio signals in accordance with a routing control setting.

In a further aspect of the invention, a method includes separating audio from input signals including video with audio, transferring selectively the input signals to at least one output, sending the separated audio signal to the at least one output, and selectively directing the input signals and separated audio signals with the at least one output.

In a yet further aspect of the invention, a method for routing video signals with embedded audio through a routing switcher includes receiving digital input video signals with embedded audio, de-embedding an audio portion from the digital input signals while separately maintaining the digital input signals, and time division multiplexing the audio portion of all of the digital input signals for transfer to an output stage on a time division multiplexed path. The digital input signals are transferred to the output stage separately from time division multiplexed audio signals. At least one of the digital input signals and the time division multiplexed audio signals are routed to a destination.

BRIEF DESCRIPTION OF THE DRAWINGS

The advantages, nature, and various additional features of the invention will appear more fully upon consideration of the illustrative embodiments now to be described in detail in connection with accompanying drawings wherein.

Figure 1:
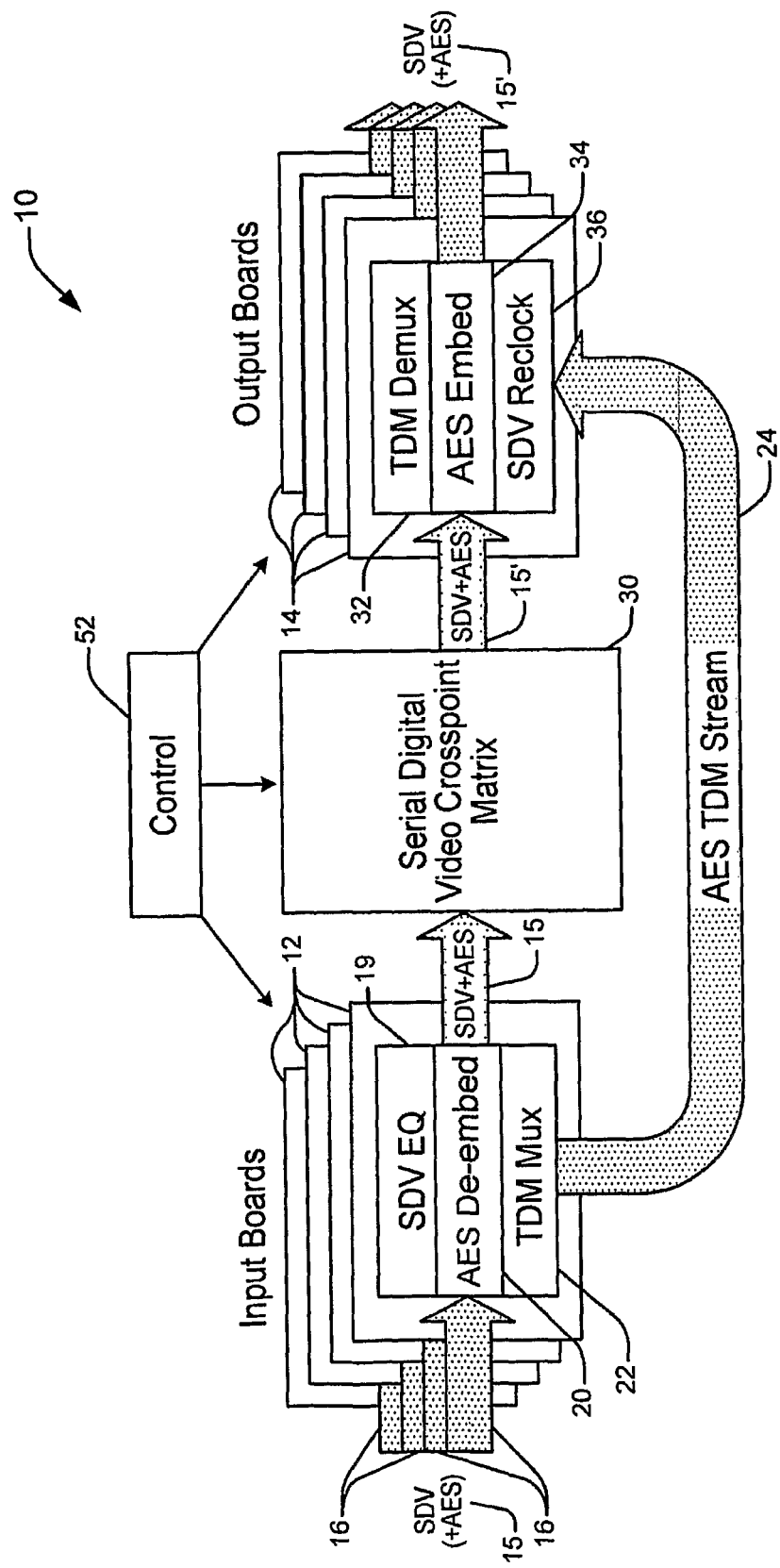
FIG. 1 is a diagram showing an exemplary routing switcher for routing audio embedded signals in accordance with one embodiment.

It should be understood that the drawings are for purposes of illustrating the concepts of the invention and are not necessarily the only possible configuration for illustrating the invention.

DETAILED DESCRIPTION OF PREFERRED EMBODIMENTS

The present invention provides systems and methods for fully embedded audio switching capability for a serial digital video router. The serial digital video router switching matrix can provide the fully embedded audio switching independently from the video switching. The router can be employed in high definition and/or standard definition applications. By providing full independent switching of the audio signals included in the serial digital video bit-streams, reduction in cost and complexity is provided and greater flexibility is achieved in selecting input and outputs for the system.

It is to be understood that the present invention is described in terms of a television facility; however, the present invention is much broader and may include any audio/video system, which receives a plurality of audio and visual signals from one or more sources to be routed to one or more destinations. Content may be received by any method for example, delivered over a network, e.g., telephone, cable, computer, satellite, etc. The present invention is described in terms of a television network application; however, the concepts of the present invention may be extended to other applications, e.g., cable, satellite network, wireless and wired network types.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring now in specific detail to the drawings in which like reference numerals identify similar or identical elements throughout the several views, and initially to FIG. 1, an illustrative system 10 shows a portion of the internal circuitry for a serial digital routing switcher for a television facility. System 10 includes a plurality of input boards 12 and a plurality of output boards 14. Each input board 12 includes one or more video inputs 16. In this example, all inputs include embedded audio. Inputs 16 preferably include serial digital video (SDV) with an embedded digital audio stream 15, e.g., a stream conforming to the Audio Engineering Society/European Broadcasting Union (AES/EBU) Standard or AES for short. In this example, each input board provides several functions. These functions include SDV signal processing by a processor 19. Signal processing may include many different processes. For example, signal detection, equalization of the stream, data re-clocking, etc.

Integrated audio de-embedding is employed for each serial digital video (SDV) input 16. Each input board 12 de-embeds the audio (AES/EBU or simply AES) from the SDV input signal by employing a de-embed module 20. All the de-embedded audio signals are then combined together on one or more time division multiplexed (TDM) bit-stream(s) 24 by a time division multiplexer (TDM) 22. The TDM bitstream(s) 24 are connected directly to video switching matrix output circuits 26 on output boards 14. The serial digital video signals with their embedded audio 15 are also connected to inputs of a video switching matrix 30.

In cases where a given output needs the video with its original embedded audio signal 15, the output of the video switching matrix 30 (e.g., a serial digital video crosspoint matrix) is connected directly to a given output (output board 14) and the original embedded audio is simply passed through with the video 15'. In cases where a given output (output board 14) needs different audio signals which are embedded in the video signal, the audio is selected from the TDM stream(s) 24 by a router control system and a time division demultiplexer 32 demuxes the signals and combines the video using audio embedding circuitry 34 associated with the given output. The desired signal may be selected using the time division demultiplexer 32 on the output board 14.

Audio is preferably embedded in the digital video bit-stream 15 in the Horizontal Ancillary Data space in accordance with the signal format standards defined by the Society of Motion Picture and Television Engineers (SMPTE). Audio is de-embedded by module 20 by selecting the desired audio channel ancillary data from the serial digital video bit stream 15, buffering the data, and reformatting as an AES/EBU digital audio bit stream. Video and audio signal selection is controlled by a routing switcher control system 52. Video and audio are usually presented to the operators as separate signal levels on the routing control panels and graphical user interfaces (e.g., control 52). This enables the operator to either select both video and audio from the same input (in which case the audio already embedded with the video is used), or the operator may select video from one input and audio from one or more alternate inputs (in which case the desired audio signals are selected from the audio TDM stream 24 and applied to an audio embedding circuit 34 of the appropriate output. A routing selection may be made by an operator, by a program or by hardware based on operating conditions or presettings.

In one embodiment, a first SDV signal is received with embedded audio and a second SDV signal is received from a different source. In accordance with this embodiment, the first and second signals have their audio deembedded and provided to output boards. The output boards can embed the audio from the first signal into the second signal and vice versa. Alternately, the outputted first and second signals may both be able to use the audio of the original first signal, or the outputted first and second signals may both be able to use the audio of the original second signal. Since all audio streams are available any audio or combination of audio channels can be selected and output including the SDV with fully embedded audio streams. This has many advantages and provides great flexibility in selecting output hardware for optimizing the outputs of the system for entertainment value or other reasons.

Figure 2:
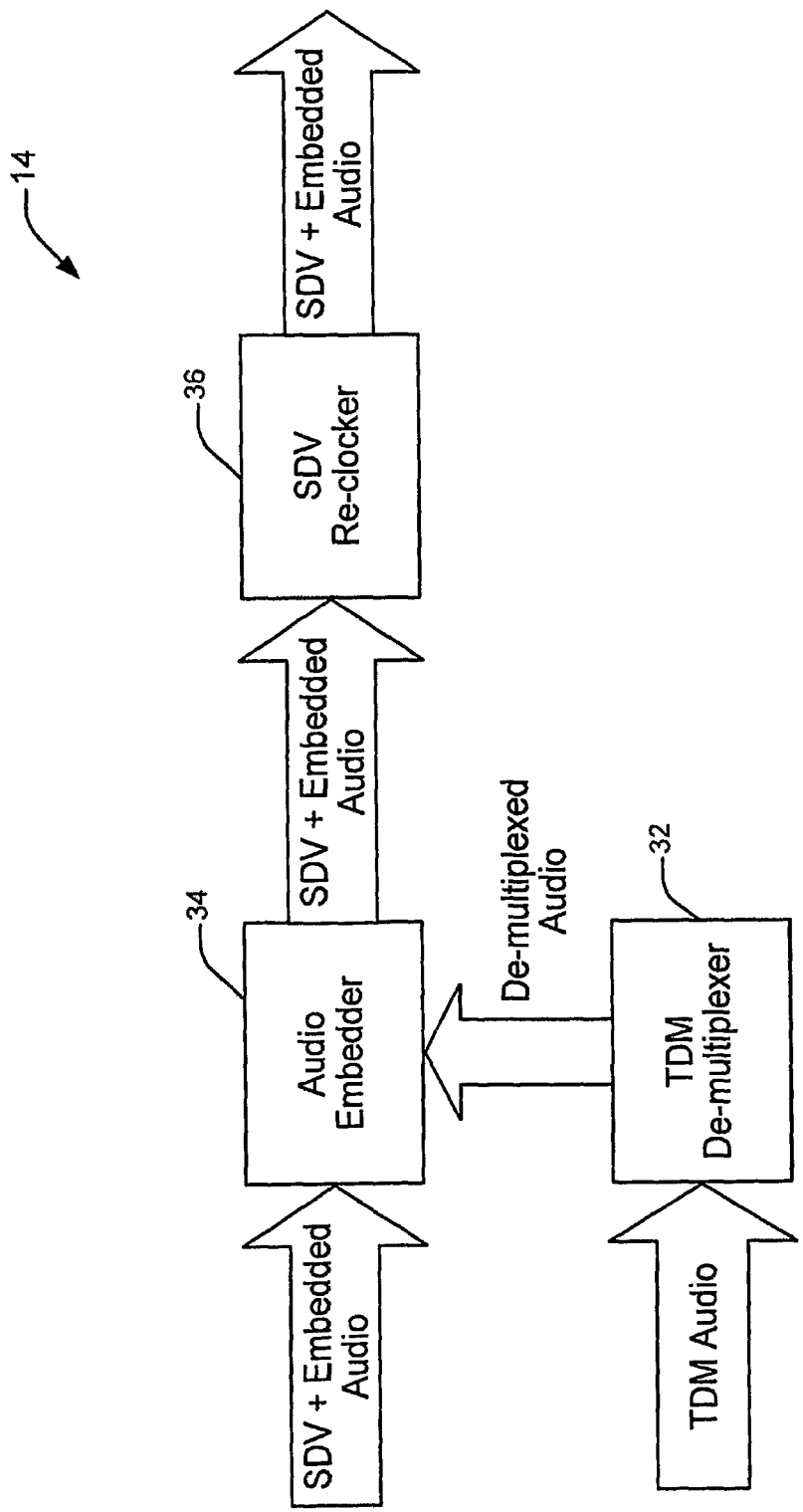
FIG. 2 is a block diagram showing an output stage in greater detail.

Referring to FIG. 2, output board or stage 14 includes a TDM audio demultiplexer 32, an audio embedding circuit 34, and a serial digital video (SDV) re-clocking circuit 36. The SDV signal is fed from an output of the crosspoint matrix (30, FIG. 1) to the video input of the audio embedding circuit 34. The TDM audio demultiplexer 32 receives the TDM audio stream and, under the control of the routing control system 52 (FIG. 1), can decode selected audio signals from the TDM audio stream and apply the audio to the audio inputs of the audio embedding circuit 34. The audio embedding circuit 34 is directed by the router control system 52 to pass one or more channels of the audio already embedded in the SDV signal (in cases where the audio originally associated with the video is needed), or to embed one or more audio signals from the TDM audio demultiplexer 32 (in cases where different audio signals are needed). The output of the audio embedding circuit 34 includes both video and one or more channels of embedded audio; this output is applied to the SDV re-clocker module 36 which extracts a clock signal from the SDV signal and uses the clock signal to re-clock the SDV signal thereby removing jitter.

In another embodiment, in addition to or instead of constructing a new system with purpose-built TDM paths from inputs to outputs, it is also possible to implement the present principles in existing serial digital video switching matrices. One way of doing this may include replacing conventional input and output circuits with those including audio de-embedding, embedding and time division multiplex (TDM) bussing. The TDM busses would be distributed from the input circuits to the output circuits by dedicating existing paths in a video switching matrix for the use of TDM. This results in an equivalent system to the one schematically represented in FIG. 1.

Figure 3A:
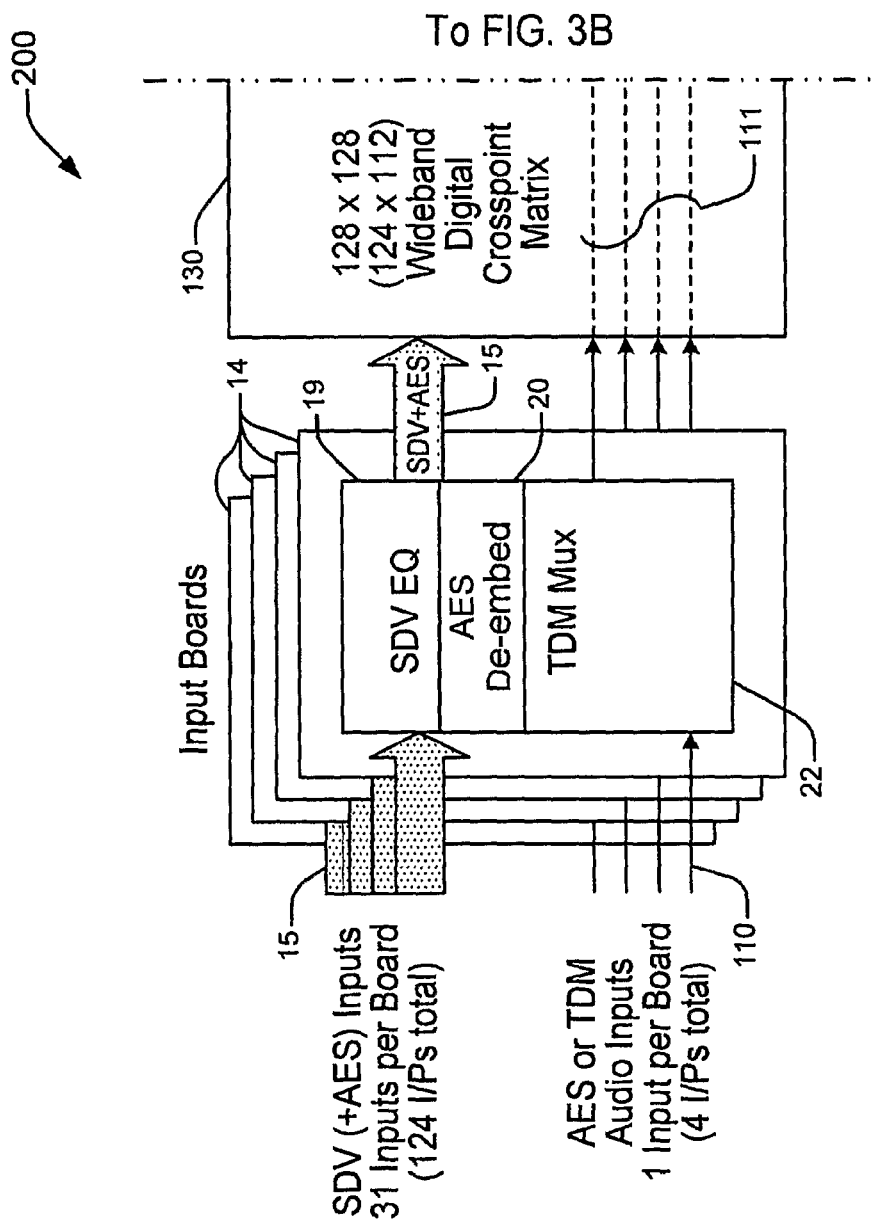
FIG. 3 is a diagram showing an exemplary routing switcher for routing audio embedded signals where a crosspoint matrix has been adapted to provide a time division multiplexed path for separately transferred audio signals in accordance with another embodiment.
Figure 3B:
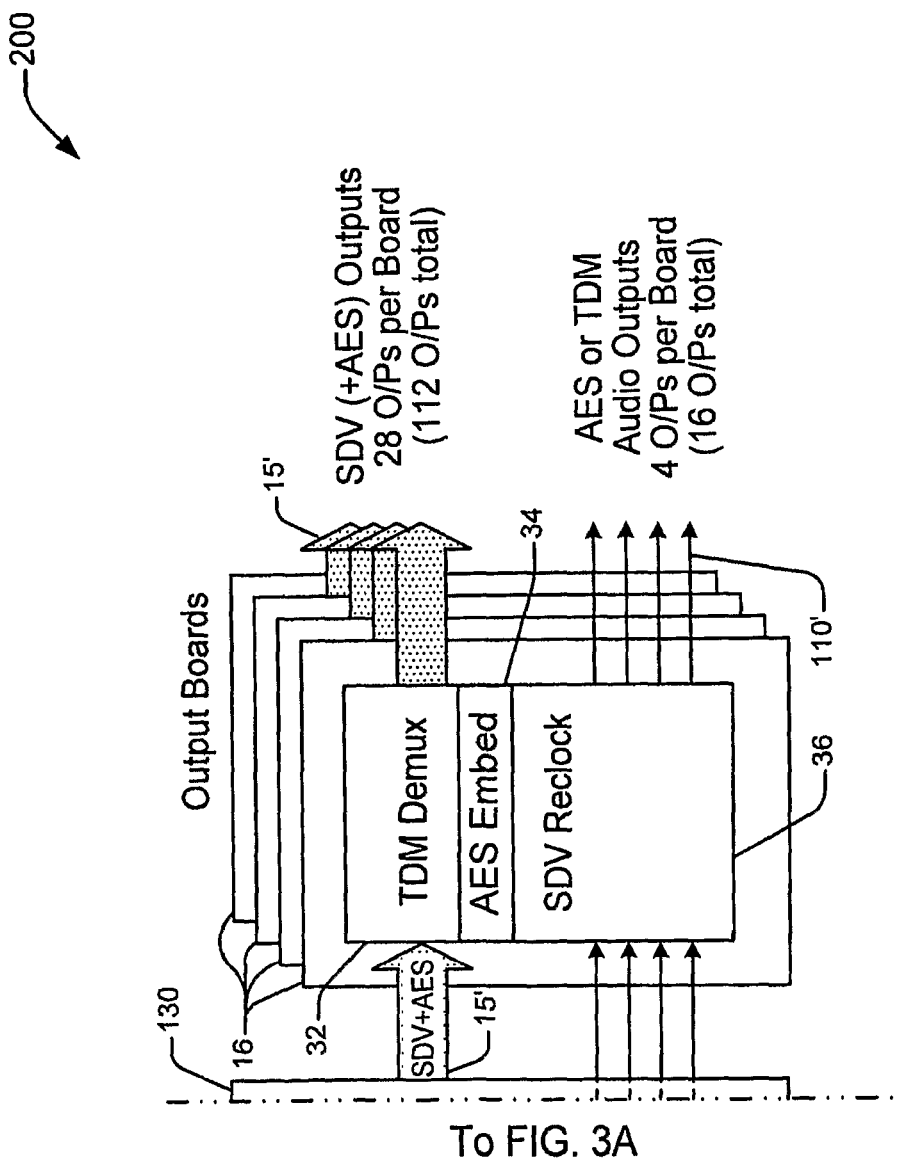
Figure 4A:
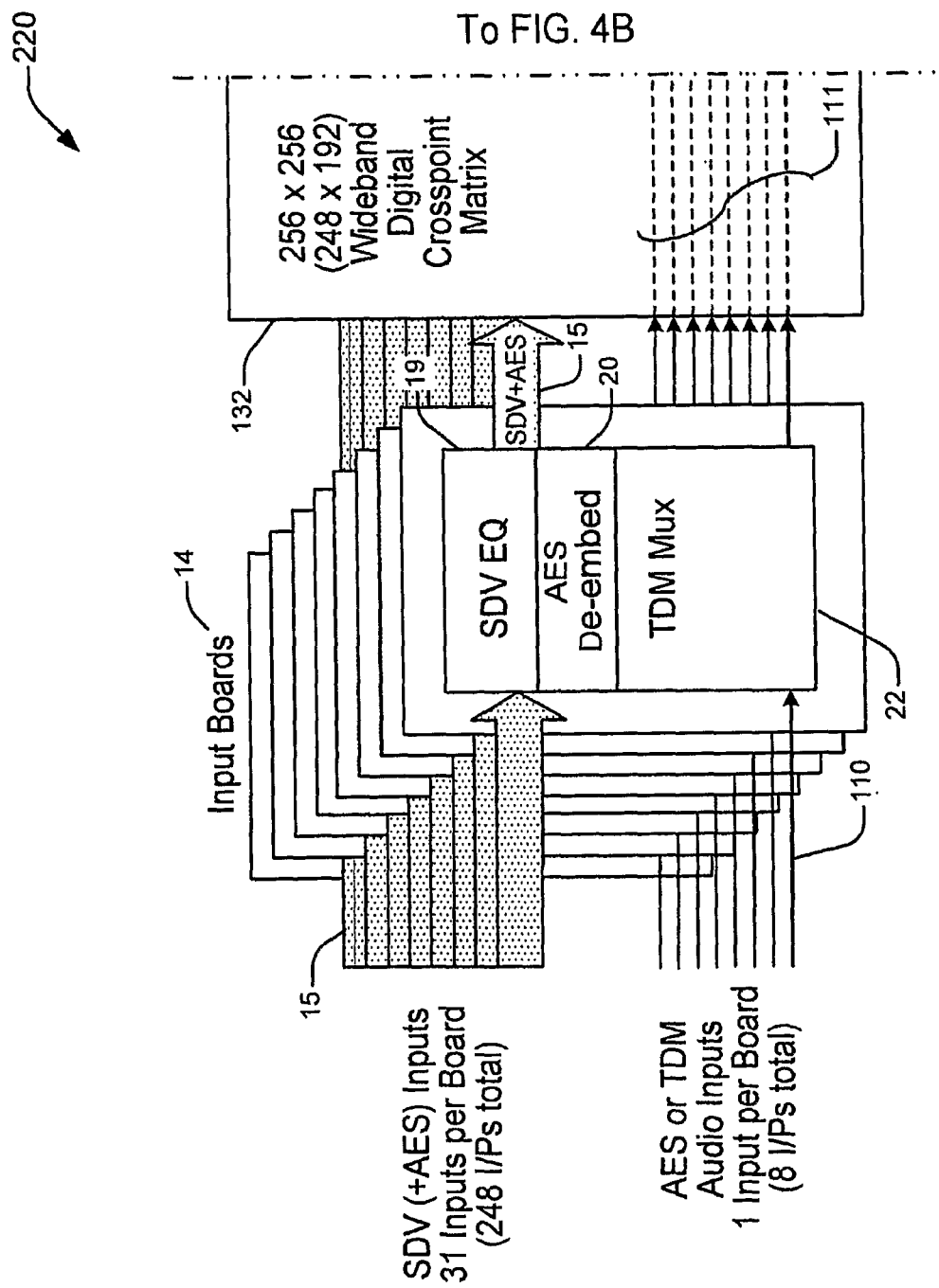
FIG. 4 is a diagram showing another exemplary routing switcher for routing audio embedded signals where a crosspoint matrix has been adapted to provide a time division multiplexed path for separately transferred audio signals in accordance with another embodiment.
Figure 4B:
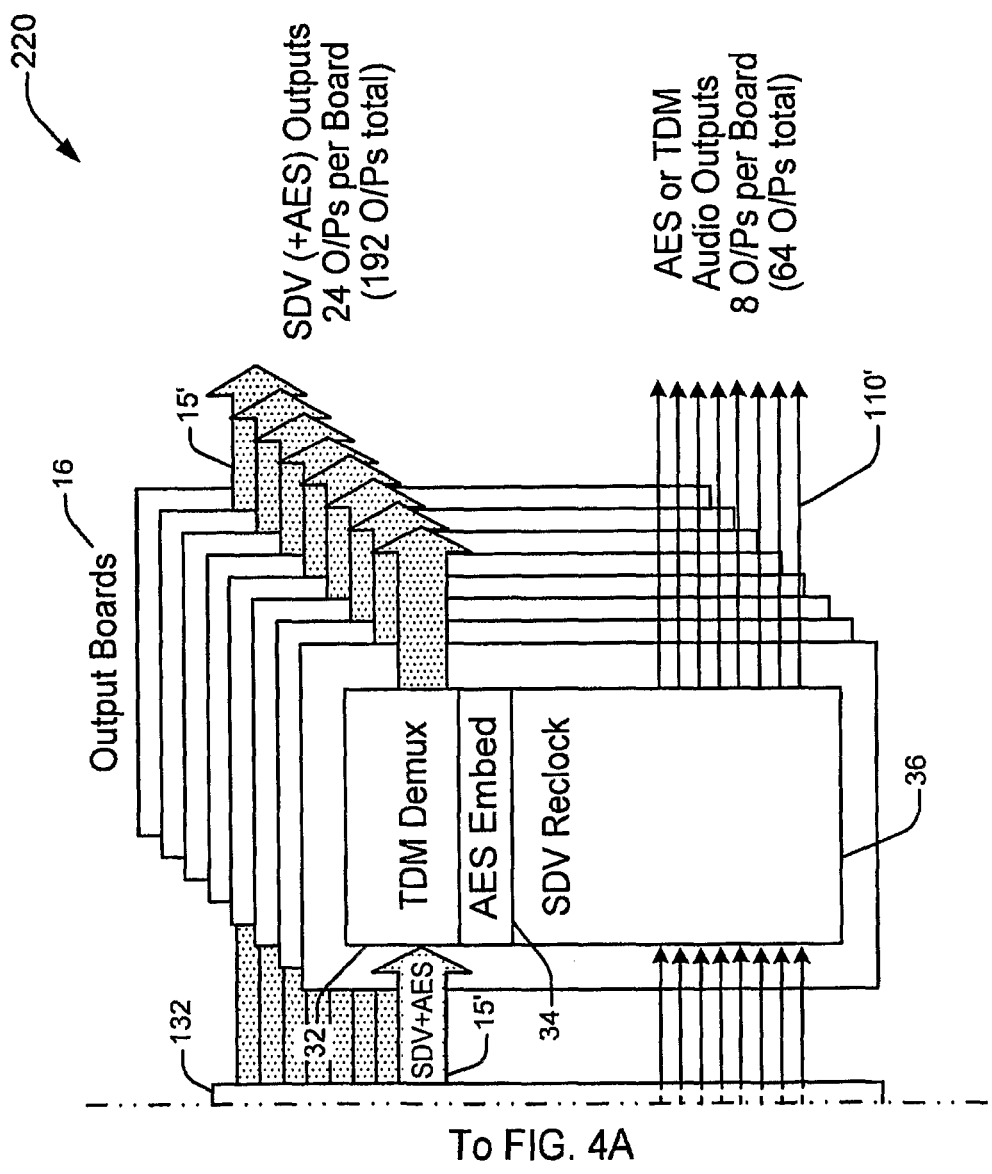

For the approach using existing hardware, the TDM bit rate is preferably compatible with the video switching matrix, in practice either the standard definition component serial digital bit rate 270 Mb/s (64 audio channels) or the high definition component serial digital bit rate of 1.48 Gb/s (up to 352 audio channels) should be employed. Since this scheme uses some of the video routing paths for the TDM busses, the effective matrix size may be reduced. FIGS. 3 and 4 show illustrative examples of modified router switch designs in accordance with the present principles.

Referring to FIGS. 3 and 4, a Grass Valley Trinix™ 128× 128 matrix (FIG. 3) and a Grass Valley Trinix™ 256×256 matrix (FIG. 4) are illustratively shown. These example devices show the possibility of including audio only inputs and outputs in the system, which can provide additional audio tracks to be combined with audio. Separate audio inputs/outputs may be employed with the embodiment shown in FIG. 1 as well. Devices 200 and 220 can include single AES/EBU (Audio Engineering Society/European Broadcasting Union) digital audio streams or they could include TDM streams including multiple audio channels such as the 270 Mb/s and 1.485 Gb/s streams described previously or the industry standard Multichannel Audio Digital Interface (MADI) format.

Referring to FIG. 3, a router 200 includes a 128×128 wideband digital crosspoint matrix 130 that is reduced to a 124× 112 matrix. The reduced matrix size is employed to provide TDM paths 111 through the matrix 130. In this embodiment, SDV with embedded audio inputs 15 include thirty-one inputs per input board 14. Since this design includes four input boards, there are one hundred and twenty four inputs in total. In addition, audio only inputs or a TDM input stream 110 may be provided, e.g., one per board (4 total). The input 110 may include multiple audio channels such as the 270 Mb/s and 1.485 Gb/s streams for television.

As described above, signal processing by a processor 19 is performed and the audio is de-embedded (20). Time division multiplexing (22) is performed and may include the TDM input 110 as well as all of the de-embedded audio from signals 15, which is placed on paths 111 and transported through the matrix 130. The video with embedded audio signals 15' are also transported to the output boards 16. In this example, four output boards 16 are available. Each output board 16 includes twenty eight outputs (total 112 outputs). The audio outputs 110' (AES or TDM) for this system may include four per board (16 total). The routing (32), embedding (34) and reclocking (36) are also performed as previously described.

Referring to FIG. 4, a router 220 includes a 256×256 wideband digital crosspoint matrix 132 that is reduced to a 248× 192 matrix. The reduced matrix size is employed to provide TDM paths 111 through the matrix 132. In this embodiment, SDV with embedded audio inputs 15 includes thirty-one inputs per input board 14. Since this design includes eight input boards, there are two hundred and forty eight inputs in total. In addition, audio only inputs or a TDM input 110 may be provided, e.g., one per board (8 total). The input 110 may include multiple audio channels such as the 270 Mb/s and 1.485 Gb/s streams for television.

As described above, signal processing by a processor 19 is performed and the audio is de-embedded (20). Time division multiplexing (22) is performed and may include the TDM input 110 as well as all of the de-embedded audio from signals 15, which is placed on paths 111 and transported through the matrix 132. The video with embedded audio signals 15' are also transported to the output boards 16. In this example, eight output boards 16 are available. Each output board 16 includes twenty four outputs (total 192 outputs). The audio outputs 110' (AES or TDM) for this system may include eight per board (64 total). The routing (32), embedding (34) and reclocking (36) are also performed as previously described. In FIGS. 3 and 4, the audio inputs 110 may include audio streams from any source and may be employed to provide a desired audio stream for selection by a routing control system (not shown). Matrixes 130 and 132 may be reduced by other amounts, as needed.

Figure 5:
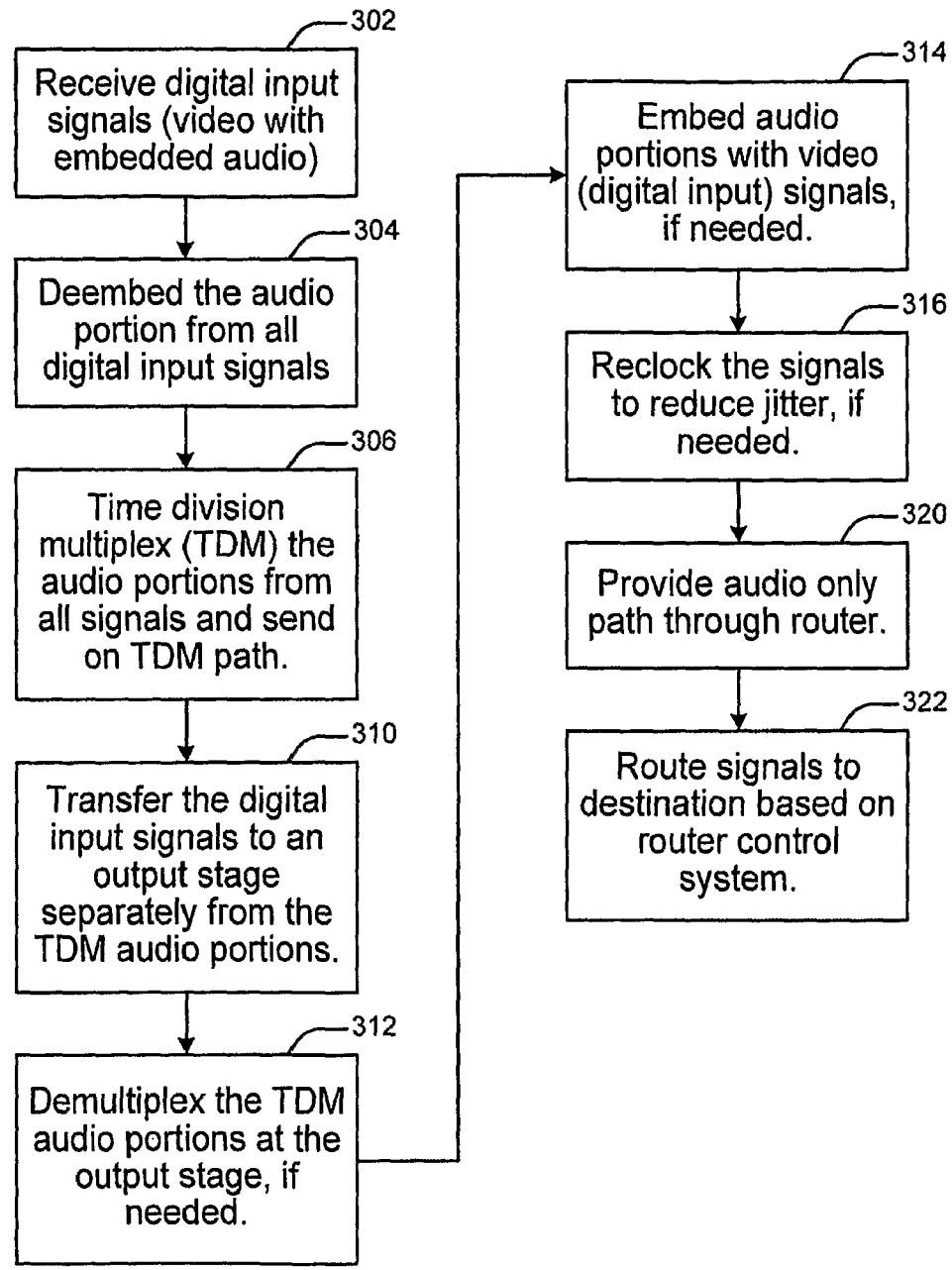
FIG. 5 is a flow diagram showing an exemplary method for routing audio embedded signals in accordance with one embodiment.

Referring to FIG. 5, an illustrative method for routing video signals with embedded audio through a routing switcher is depicted in accordance with one embodiment. In block 302, digital input video signals with embedded audio (or audio only signals) are received. These signals are preferably received using an input board having a de-embed module. In block 304, an audio portion is de-embedded from the digital input signals while separately maintaining the digital input signals (the audio only signals are maintained as well). The audio portion is time division multiplexed for all of the digital input signals for transfer to an output stage on a time division multiplexed path in block 306. The time division multiplexed path may include a separate bus or a path through a crosspoint matrix, where at least a portion of a crosspoint matrix is used to implement the path. A reduction in the matrix size may be employed to permit the time division multiplexed path through the matrix.

In block 310, the digital input signals are transferred to the output stage separately from time division multiplexed audio signals. The digital input signals are preferably transferred using the crosspoint matrix, and are transferred with the original embedded audio. In block 312, the time division multiplexed audio signals are demultiplexed to provide the signal to particular destinations or to simply reproduce the audio to be re-embedded with a same or different video signal in accordance with particular requirements, if needed. In block 314, embedding a time division multiplexed audio signal into to a digital input signal or video signal may be performed to reconstitute a video signal with new embedded audio. In block 316, reclocking may be performed, if needed, by extracting a clock signal from the SDV signal to re-clock the SDV signal thereby removing jitter.

In block 320, an audio only input may be provided and configured to receive an audio signal or a time division multiplexed audio signal for transfer to the output stage. The audio only signals are available for mixing with video signals as with de-embedded audio signals. The audio only input may be received and employed at any point in the operation. In block 322, at least one of the digital input signals and the time division multiplexed audio signals are routed to a destination from the output stage. The destination is usually selected by a routing control system, by a user, by a program, in accordance with preselected conditions, etc. For example, if an original audio stream is sent with English audio and the film is sent to a Spanish station, the Spanish audio may be preselected for a given destination from a particular output board or stage. The signals are routed to destinations based on a router control system or programmed selections (e.g., routing settings).

Having described preferred embodiments for an embedded audio routing switcher (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims.

The invention claimed is:

1. A method for routing video signals with embedded audio through a routing switcher, the method comprising:
   receiving a plurality of digital input video signals each having embedded audio;
   de-embedding an audio portion from each of the plurality of digital input video signals to generate a plurality of audio signals while separately maintaining the digital input video signals;
   time division multiplexing the plurality of audio signals for transfer to an output stage on a time division multiplexed path;
   transferring the digital input video signals to the output stage separately from the time division multiplexed audio signals; and
   routing at least one of the digital input signals and the time division multiplexed audio signals to a destination, wherein the time division multiplexed audio signals are demultiplexed prior to routing to the destination.

2. The method as recited in claim 1, wherein the time division multiplexed path includes a path through the crosspoint matrix.

3. The method as recited in claim 1, further comprising providing an audio only input configured to receive one of an audio input signal and a time division multiplexed audio input signal for transfer to the at least one output.

4. The method as recited in claim 1, further comprising embedding a time division multiplexed audio signal into to the digital input signal to reconstitute a video signal with new embedded audio.

* * * * *